United States Patent [19]

Senuma et al.

[11] 4,394,082
[45] Jul. 19, 1983

[54] SHUTTER FOR CAMERA

[75] Inventors: Michio Senuma, Tokyo; Kunio Watanabe, Kawasaki, both of Japan

[73] Assignee: Canon Kabushiki Kaisha, Tokyo, Japan

[21] Appl. No.: 225,524

[22] Filed: Jan. 16, 1981

[30] Foreign Application Priority Data

Jan. 23, 1980 [JP] Japan ............................... 55-6900[U]

[51] Int. Cl.³ .............................................. G03B 9/40
[52] U.S. Cl. ................................................... 354/246
[58] Field of Search ............................. 354/245–249, 354/226, 252; 355/74, 101, 121, 123, 124; 350/266, 268; 352/204; 427/305, 438; 428/156, 157, 164, 332

[56] References Cited

U.S. PATENT DOCUMENTS 4,054,892 10/1977 Nakagawa et al. ............. 354/246 X
4,150,890 4/1979 Nakagawa et al. ................. 354/246

Primary Examiner—William B. Perkey
Attorney, Agent, or Firm—Toren, McGeady and Stanger

[57] ABSTRACT

The shutter blades of a camera are made lighter in weight in order to reduce the driving power needed to obtain a desired running speed by forming the shutter blades of a metal coated plastic sheet member which may be painted black in order to prevent light reflection, with the thickness of the metal coating being between 0.001 to 0.005 mm.

2 Claims, 4 Drawing Figures

SHUTTER FOR CAMERA

BACKGROUND OF THE INVENTION

1. Field of the Invention

The present invention relates to a shutter assembly for a camera having shutter blades which consist of metallized plastic.

2. Description of the Prior Art

Quite recently along with advances in electronification of camera, the shutter driving thereof has been changed from the conventional mechanical spring driving type into an electromagnetic driving source. Thus, along with advances in automatic cameras the electronically driven shutter is more frequently used, whereby various kinds of electromagnetically driven shutters whose blades are driven by means of an electromagnetic driving source have been proposed. However, in the case where the shutter is electromagnetically driven, there remain many problems to be solved. With regard to the capacity of the power source to be built into the camera it is desired to develop a battery which is compact and light and which has a large capacity. Because the battery must be small to enhance portability, there is a limit to the capacity of the power source which can be built in. The permanent magnet presently considered best for obtaining the magnetic power for the electromagnetic driving source is the rare earth magnet. However, it is still difficult to obtain a strong electromagnetic driving force due to the restrictions of the compact camera. Namely, it is difficult to obtain as high a shutter running speed as can be obtained by means of the conventional mechanical driving devices. Further, it is impossible to allow the field coil or the yoke constituting the electromagnetic driving source to be too large. On the other hand, the size is restricted due to the compactness of the camera.

Thus, in order to obtain a shutter running speed almost equal to that of the conventional mechanical shutter in a device using an electromagnetically driven shutter having properly selected magnetic circuit members such as the magnet, the coil and the yoke constituting the electromagnetic driving source which are combined with a compact built-in power source, it is proposed to lower the load for example by making the shutter blades themselves lighter in weight.

The above-mentioned problem is particularly important in a focal plane shutter wherein it is necessary to open and close an aperture with a comparatively large area, so that thus far shutter blades have been made of thin metal sheet small in specific weight. Structurally, the shutter blades are constituted of thin material (0.03–0.05 mm in thickness) for example if titan, aluminum, berylium and so on. Further, instead of thin metal sheet, light shading plastic sheet has been proposed as the material for the shutter blades.

The shutter blade member made of thin metal sheet which is small in specific weight is found to involved high cost without providing significant improvement in the running shutter speed. On the other hand, if the sheet is made thinner, the rolling cost increases further, pin holes occur more often, and there is a danger of deformation and rigidity. Further, in case of the light shading plastic, the light shading ability of the shutter blade is insufficient. Further, embossing is necessary in order to avoid projection of the calked portion for mounting the driving arms on the shutter blades. Thus the plastic sheet is hard to cold form so that the forming work is difficult. Also, under the higher temperature the formed part is apt to resume the original shape. Further, because the rigidity of the material is weak strong calking cannot be effected. Further, in case the shutter blades are arranged in the neighborhood of the focal plane of the camera as in the case of a focal plane shutter, the shutter blades are instantaneously burnt so as to cause a pin hole where an intense incident light coming through the lens froms an image on the shutter blades. The tests have proved that the pin hole is produced in a remarkably short time as compared with the case of a cloth shutter.

Consequently, it has been proposed quite recently to apply a thin metal sheet on the plastic sheet or metallize the surface of the plastic sheet.

However, when a thin metal sheet is applied upon the plastic sheet it is necessary to roll the metal sheet very thin, whereby the rolling cost is increased and there occurs greater danger of a pin hole. The smallest thickness which can be obtained for the metal sheet is 0.01–0.02 mm so that the overall thickness of the shutter blade with the metal sheet thereon cannot be made sufficiently small and therefore the running shutter speed cannot be significantly improved.

Because on the other hand, the thickness of the metal coating on the surface of the plastic sheet is as small as 0.0001–0.0003 mm, the overall thickness of a shutter blade can be made sufficiently small that the running shutter speed can be significantly improved. Namely, the metal coated plastic sheet can be made use of as shutter plane very effectively. However, such a plastic sheet is not suitable for constituting a plural number of the shutter blades. In order to make a shutter blade it is necessary to emboss a part of the shutter blade so that the calked portion is buried in the embossed part. Thus, the thickness of the metal coating on the plastic sheet is too small to obtain a high forming accuracy by embossing, while the rigidity of the calked portion is so weak that the shutter blade is inferior in durability and reliability.

SUMMARY OF THE INVENTION

An object of the present invention is to solve the above shortcomings by metal coating the surfaces of the plastic sheet so as to obtain a shutter blade with high accuracy. More specifically, the invention is directed toward the concept of applying to the plastic sheet forming the shutter blade a metal coating having a thickness of between 0.001 and 0.005 mm.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
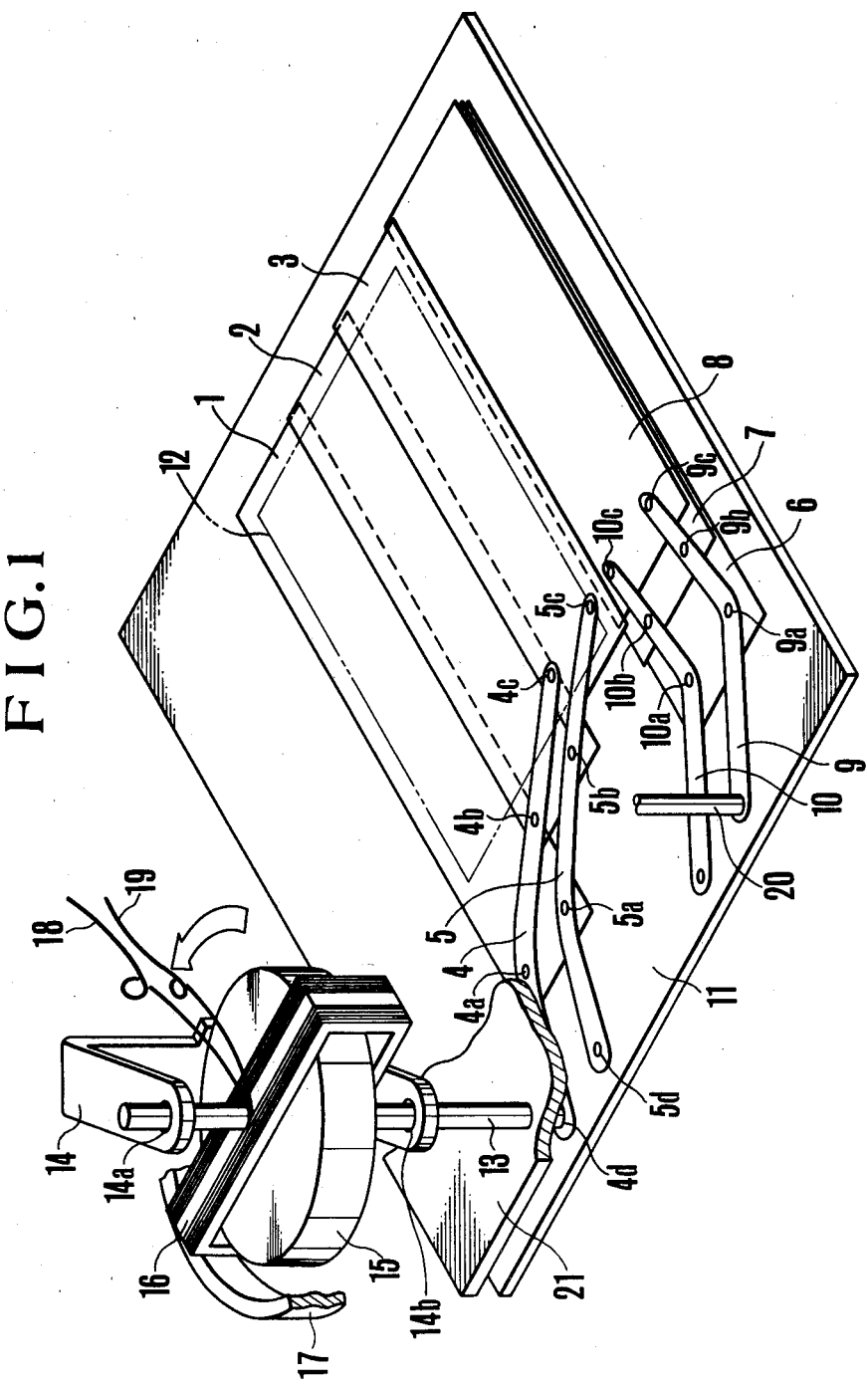
FIG. 1 shows the electromagnetically driven shutter in accordance with the present invention in perspective view.

FIG. 1 shows an embodiment of the electromagnetically driven shutter in accordance with the present invention. In the drawing, 1, 2 and 3 are the leading shutter blades consisting of metallized thin plastic plates. 4 and 5 are the leading shutter blade driving arms consisting of light metal or plastic material, whereby they are connected to the shutter blades at 4a, 4b and 4c and 5a, 5b and 5c by means of embossing. The arms 4 and 5 are attached to the shutter base plate 11 at 4d and 5d. 6, 7 and 8 are the tail shutter blades, while 9 and 10 are the rear shutter blade driving arms, constructed in the same way as in case of the leading shutter blades. 11 is the shutter base plate having an opening 12 for the light beam. The drawing shows the shutter in the charged state. 13 is the output shaft of the electromagnetic driving shaft for driving the leading shutter blades, at one end of which output shaft is the center 4d lof the rotation of the leading shutter blade driving arm 4. 14 is the support member of the stator of the driving source, and 15 is the permanent magnet constituting the stator together with the yoke 17, consisting of rare earth material magnetized along the direction of the diameter. 16 is the movable coil constituting the rotor and secured on the output shaft so as to be rotated along the direction of the arrow when the driving current is supplied through the terminals 18 and 19. Although in the drawing the electromagnetic driving source for the rear shutter blades are omitted, a driving source of a similar construction to that of the leading shutter blade driving source is provided so as to open and close the rear shutter blades by means of the output shaft 20. 21 is the base plate of the electromagnetic driving source.

Figure 2:
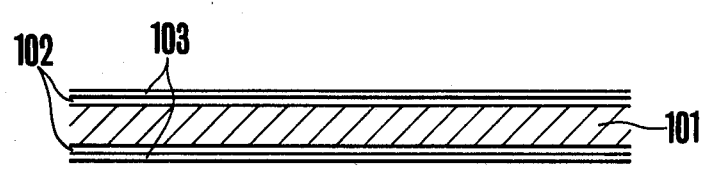
FIG. 2 shows the shutter blade in FIG. 1 in section.

FIG. 2 shows the plastic sheet in accordance with the present invention in section. In the drawing, 101 is the plastic sheet, on both of whose surfaces metal layers 102 of for example nickel are formed and then painted black 103.

Figure 3:
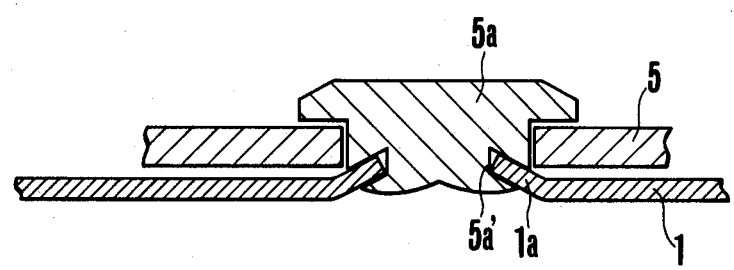
FIG. 3 shows the connection of the shutter blade to the driving arm in FIG. 1 in an enlarged section.

FIG. 3 shows the connection of the shutter blades and the driving arm in FIG. 1 in enlarged section. In the drawing, 1 is a shutter blade, 5 is the driving arm and 5a is a calked portion. The shutter blade 1 is provided with a hole 1a for the camera foot by embossing in advance. It is difficult to obtain a sufficient forming accuracy only of a plastic sheet by embossing, whereby it is possible to obtain a sufficient forming accuracy only by metallizing on both surfaces of the sheet in accordance with the present invention.

Figure 4:
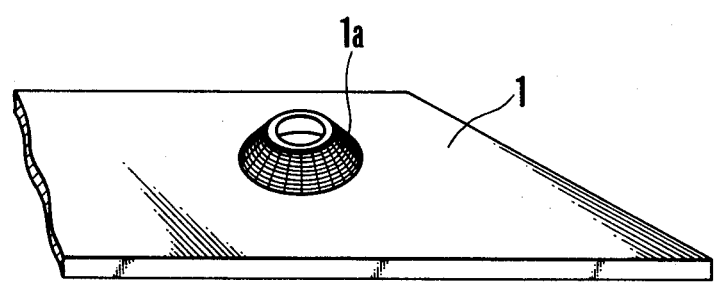
FIG. 4 shows the calked portion of the embossed shutter blade in FIG. 1 in perspective view.

FIG. 4 shows a shutter blade provided with a hole for the camera foot by embossing.

As explained so far in the case of the shutter blade in accordance with the present invention the plastic sheet is metal coated on both surfaces, whereby by choosing the sheet thickness to be between 0.05–0.1 mm and the metal coating thickness to be between 0.001–0.005 mm it is possible to carry out the embossing easily and to obtain a sufficient forming accuracy. The shutter blade made in this way has a long life, while a high calking accuracy can be obtained. Therefore, the optimum thickness of the metal coating would be 0.003–0.004 mm in viewof cost and efficiency. Consequently by making use of such material a remarkably light electromagnetically driven shutter blade can be constructed in such a manner that the load of the shutter blades upon the electromagnetic driving source can be remarkably reduced. Further in case of the focal plane shutter it can be avoided that the shutter blades could be damaged by means of the instantaneous image formation of the sun by causing a pin hole. Thereby, in the case of the shutter blade the surfaces are painted black in order to prevent reflection from the surface.

As explained above, in case of the electromagnetically driven shutter in accordance with the present invention in order to make the shutter blade remarkably light and excellent in durability and light shading ability the metallized plastic sheet is made use of in such a manner that the load upon the driving source is reduced in order to increase the running speed of the shutter blade sufficiently.

Thus, it is convenient for the electromagnetically driven shutter to be built in the camera in view of space. Further, in view of the power consumption and the manufacturing cost the shutter blade in accordance with the present invention is more advantageous than that of the conventional metal sheet. Thus in accordance with the present invention a high efficiency shutter can be obtained, which is remarkably profitable for the construction of the camera.

While specific embodiments of the invention have been shown and described in detail to illustrate the application of the inventive principles, it will be understood that the invention may be embodied otherwise without departing from such principles.

What is claimed is:
1. A shutter for a camera comprising:
an opening for light to pass therethrough;
a plurality of shutter blades for opening and closing said opening for said light, said plurality of shutter blades comprising
  (a) a plastic sheet
  (b) a metal layer formed on both surfaces of said plastic sheet, said metal layer having a thickness of between 0.001 to 0.005 mm;
  (c) a black coating on the surface of said metal layer;
  (d) an embossed member for effecting connection with said shutter blades; and
  (e) shutter driving members mounted on said embossed portions of each of said plurality of shutter blades so as to connect said shutter blades to each other, said members opening and closing said plurality of shutter blades.
2. A shutter for a camera in accordance with claim 1 wherein said metal layer is a nickel coating.

* * * * *